(12) United States Patent
Lovgren et al.

(10) Patent No.: US 7,441,311 B2
(45) Date of Patent: Oct. 28, 2008

(54) T-BOLT CLAMP QUICK ATTACH LATCH

(75) Inventors: Richard A. Lovgren, Natrona Heights, PA (US); Drew A. Demangone, Latrobe, PA (US); Michael E. Amedure, Lake Orion, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 125 days.

(21) Appl. No.: 11/368,549

(22) Filed: Mar. 6, 2006
(Under 37 CFR 1.47)

(65) Prior Publication Data

US 2007/0209166 A1    Sep. 13, 2007

Related U.S. Application Data

(60) Provisional application No. 60/658,475, filed on Mar. 4, 2005.

(51) Int. Cl.
*F16L 33/04* (2006.01)
*B65D 63/08* (2006.01)
*F16L 33/00* (2006.01)

(52) U.S. Cl. ....................................................... 24/279
(58) Field of Classification Search .................... 24/279

See application file for complete search history.

(56) References Cited

U.S. PATENT DOCUMENTS

| 2,816,343 | A | * | 12/1957 | Decker, Jr. | .................... 24/279 |
| 2,837,383 | A | | 6/1958 | Skelly | |
| 2,940,151 | A | | 6/1960 | Skelly | |
| 2,941,273 | A | | 6/1960 | Skelly | |
| 4,381,020 | A | * | 4/1983 | Daghe et al. | ................... 24/279 |
| 5,329,673 | A | | 7/1994 | Mason | |
| 6,584,654 | B1 | | 7/2003 | Schaub | |
| 6,691,379 | B2 | | 2/2004 | Schaub | |
| 2004/0130147 | A1 | | 7/2004 | Cousineau | |

* cited by examiner

*Primary Examiner*—Robert J Sandy
(74) *Attorney, Agent, or Firm*—Reising, Ethington, Barnes, Kisselle, P.C.

(57) ABSTRACT

A T-bolt pipe clamp of the quick-attach type in which a head portion of the T-bolt can be inserted into or removed from one of the connecting ends of the clamp. The clamp has first and second loop ends that are drawn together during tightening by a T-bolt fastener. The first loop end has a latch insert that accepts the head portion of the T-bolt and provides additional strength to the loop end. The latch insert can include a tab to help guide the T-bolt into the loop end and thereafter prevent it from too easily disengaging the loop end.

7 Claims, 6 Drawing Sheets

T-BOLT CLAMP QUICK ATTACH LATCH

CROSS-REFERENCE TO RELATED APPLICATIONS

This application claims the priority of U.S. Provisional Application No. 60/658,475, filed Mar. 4, 2005. The contents of this provisional application are hereby incorporated by reference.

BACKGROUND OF THE INVENTION

The present invention relates generally to pipe clamps and, more particularly, to T-bolt clamps used for mechanically fastening objects together.

DESCRIPTION OF RELATED ART

T-bolt clamps can be used as band clamps for securing tubular members together in a telescopic, or overlapping, manner. See, for example, U.S. Pat. Nos. 5,329,673 top Mason and 6,584,654 and 6,691,379 to Schaub. Alternatively, they can be used as pipe couplers such as in v-band clamps for connecting flanged ends of pipes or other tubular members together in an abutting configuration. See, for example, the prior art v-band clamp shown in FIG. 1 of U.S. Patent Application Publication No. 2005/0108859 to Amendolea et al. These various prior art clamps utilize a T-bolt fastener which includes a nut and threaded T-bolt having a head portion that is captively retained within a slotted bight at one end of the clamp band.

Prior art T-bolt clamps also exist that permit the head portion of the T-bolt to be disconnected from the slotted bight to permit quick attachment of the clamp without the need to unthread the nut from the T-bolt. FIG. 1 shows one such prior art T-bolt clamp 10 that includes a latch assembly 12 connected to a flexible, flat metal band 14 having an inner surface 16 and an outer surface 18. The band 14 has a first loop end 20 and a second loop end 22 and is adapted to mechanically fasten objects together, wherein the loop ends 20, 22 are formed by a portion of the band 14 being bent back and attached to the outer surface 18 of the band 14. FIG. 2 shows an alternative loop end design in which the loop end 20 is formed of a separate, wider piece of band material that is welded to the band 14 at each end of the piece. The attachment of the loop ends 20, 22 to outer surface 18 of the band 14 is done by spot welding. The first loop end 20 includes two laterally-spaced first end bearing loops 24 defining a first end cutout or slot 25 therebetween (shown in FIG. 2). Likewise, the second loop end 22 includes two laterally-spaced second end bearing loops 26 defining a second end cutout (slot) 27 therebetween, as shown in FIG. 1.

The assembly 12 includes a T-bolt 30, a trunnion 36, and a nut 38. The T-bolt 30 has a head portion 32 and a shank portion 34 with the head portion being pivotally received within bearing loops 24 of the first loop end 20 of the band 14 (shown in FIG. 2). The trunnion 36 is pivotally received within the bearing loops 26 of the second loop end 22 of the band 14 (shown in FIG. 1). The shank portion 34 of the T-bolt 30 extends through a passageway of the trunnion 36, and the nut 38 is received on the shank portion 34 of the T-bolt 30. As best seen in FIG. 2, the slot 25 includes a widened section that allows the head portion 32 to be inserted into and removed from the space with first loop end 24. The slot 25 also includes a narrowed section bounded on either side by the bearing loops 24. This construction provides the quick attachment feature to the clamp since it allows the clamp to be quickly attached to the object(s) being clamped by inserting the T-bolt head portion 32 into the slot 25 rather than having to unthread the nut 38. Then, to tighten the clamp, the nut 38 is rotated into engagement with the trunnion 36 and this rotation is then continued while the loop ends 20, 22 are drawn towards each other as a result of the engagement of the head portion 32 with the bearing loops 24 and the trunnion 36 with the bearing loops 26.

One of the drawbacks to the prior art T-bolt clamp 10 is that the slots 25, 27 are made directly in the band material, thus weakening the clamp 10. When the head portion 32 of the T-bolt 30 is inserted into the slot 25 in the first loop end 20, the head portion 32 moves forward to engage the first end bearing loops 24, thus transferring a load to the band material, as best shown in FIG. 2. Where thinner sheet metal material or weaker steel stock is used for the band material, the bearing loops 24 of the first loop end 20 can spread apart when a tightening load is applied in a direction represented by arrow L, in which case the head portion 32 of the T-bolt 30 can disengage from the first end bearing loops 24. In some prior art solutions, the thickness and width of the band 14 can be increased to provide strength to the loop ends 20, 22. This increases the material cost and can makes the clamp 10 more cumbersome than may otherwise be needed for a particular application. Another prior art solution is to reduce the size of the head portion 32 of the T-bolt 30, thus allowing for a smaller first end slot 25 in the band 14. However, this solution may not provide enough surface area for the head portion 32 of the T-bolt 30 to transfer a load to the first end bearing loops 24, thus weakening the clamp 10. Another disadvantage of this prior art clamp is that the head portion 32 of the T-bolt 30 can spin when tightening or loosening the clamp 10, such as with a socket tool, thereby disengaging the head portion 32 of the T-bolt 30 from the first end bearing loops 24 on the clamp 10.

SUMMARY OF THE INVENTION

The present invention provides a T-bolt clamp that includes a band, fastening assembly, and latch insert that works in conjunction with the fastening mechanism to provide improved strength to the clamp. The band has first and second loop ends and a roundish body portion that extends circumferentially between the first and second loop ends. The fastening assembly is connected to the loop ends and it includes a T-bolt fastener and trunnion, with the T-bolt fastener including a T-bolt having a head portion that connects to the first loop end and an at least partially threaded shank portion that extends from the head portion to the second loop end. The trunnion is connected to the second loop end with the shank extending through the trunnion. The T-bolt fastener further includes a nut that threads onto the shank and engages the trunnion, whereby the loop ends can be drawn towards each other to tighten the clamp by further threading the nut onto the shank after it engages the trunnion to thereby draw the trunnion towards the head portion of the T-bolt. The first loop end includes a slot that permits the head portion of the T-bolt to be inserted into and removed from the first loop end without removal of the nut from the shank portion. The slot defines first and second bearing loops in the first loop end, with the head portion of the T-bolt being retained in the first loop end by the bearing loops during tightening of the clamp. The latch insert is located within the first loop end and it defines a cavity sized to receive the head portion of the T-bolt. The latch insert has an opening aligned with the slot of the first loop end such that the head portion can be inserted into the cavity via the slot and the opening.

Several embodiments of the latch insert and T-bolt are provided.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE INVENTION

Figure 1:
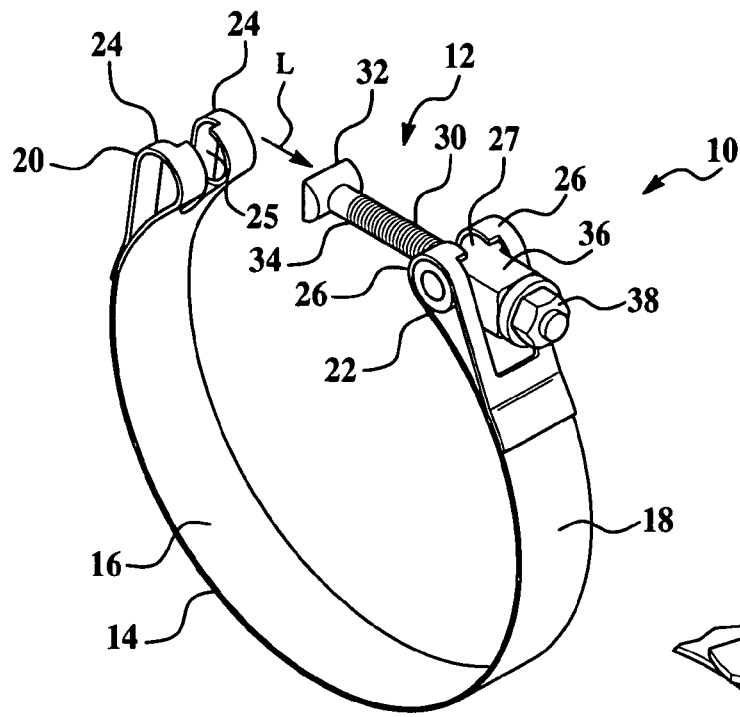
FIG. 1 is a perspective view of a prior art T-bolt clamp.
Figure 2:
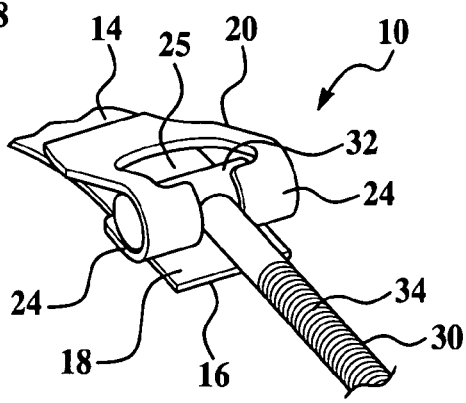
FIG. 2 is a perspective view of a portion of a prior art T-bolt clamp.

Referring to FIGS. 3-6, there is shown a T-bolt clamp 50 that has some of the same features as that of the prior art clamp 10 of FIGS. 1 and 2, and for that reason, features and components of T-bolt clamp 50 that are similar to those of prior art clamp 10 are identified using the same numerals. Clamp 50 includes a band 14 having a roundish body portion that extends circumferentially from a first loop end 20 to a second loop end 22. Each loop end 20, 22 has a respective slot 25, 27 that defines a respective pair of bearing loops 24, 26. The loop ends are formed using unitary end portions of the band 14 that are folded back onto the outer surface 18 of the band and attached by welding, crimping, mechanically interlocking them, or by any other suitable means. When forming the second loop end 22, a trunnion 36 is placed within the loop end being formed prior to permanently attaching the band material to the outer surface. In this way, the trunnion 36 is captively retained in the second loop end 22. Tightening of the clamp 50 is done as in the prior art clamp 10. The shank portion 34 of the T-bolt 30 extends through a passage 37 in the trunnion and the nut 38 is then threaded onto the shank until it engages the trunnion 36. The nut can directly engage the trunnion or can do so indirectly via a washer or other component(s). As the nut is further tightened, it bears against the trunnion 36, thereby drawing the two loop ends 20, 22 together.

Figure 3:
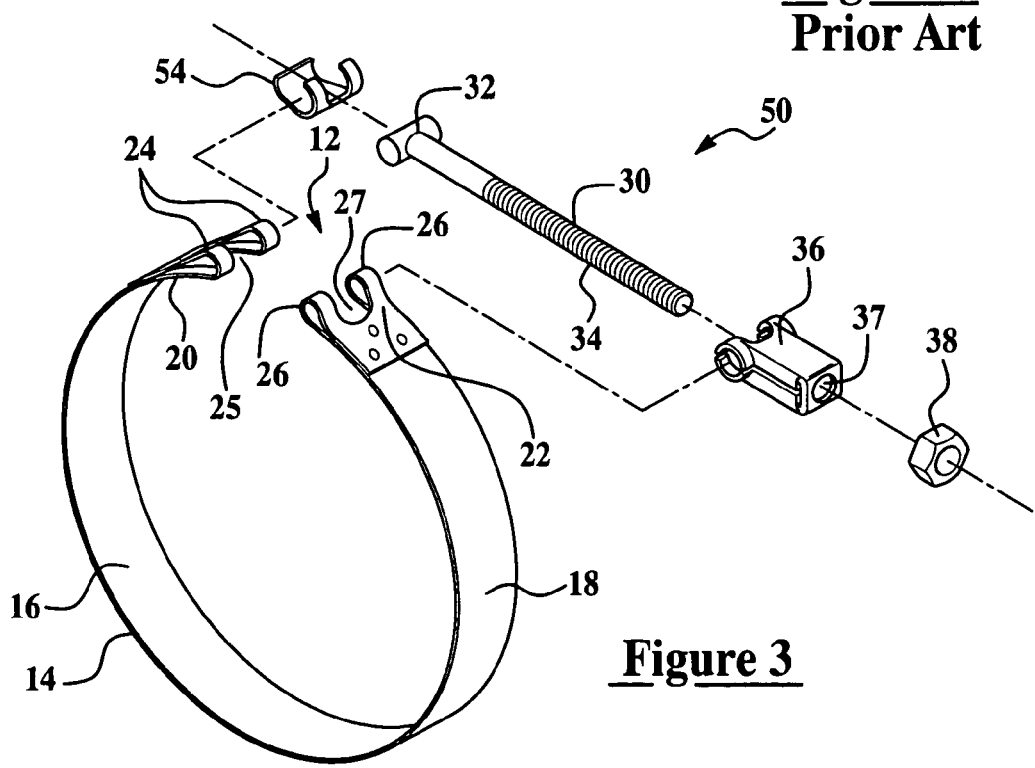
FIG. 3 is an exploded view of the T-bolt clamp made in accordance with the present invention.
Figure 3A:
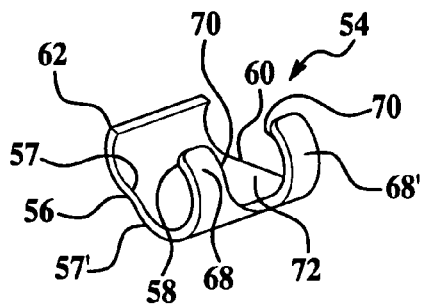
FIG. 3a is a perspective view of a latch insert used in the T-bolt clamp of FIG. 3.
Figure 4:
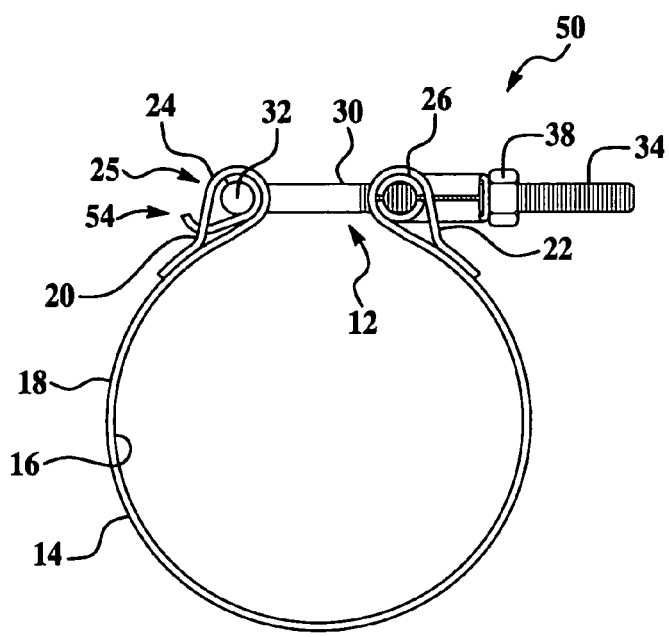
FIG. 4 is a side elevational view of the T-bolt clamp of FIG. 3.
Figure 5:
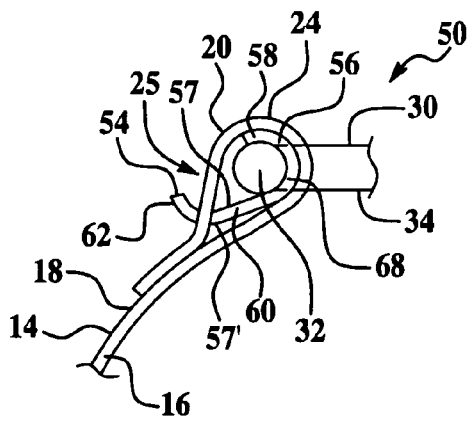
FIG. 5 is a side elevational view of a portion of the T-bolt clamp of FIG. 4.
Figure 6:
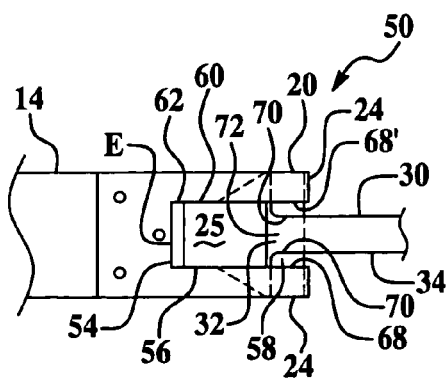
FIG. 6 is a top plan view of a portion of the T-bolt clamp of FIG. 4.

As in the prior art clamp, the slot 25 in the first loop end 20 is sized to receive the head portion 32 of a T-bolt 30, with the so that it can be quickly attached and detached from the first loop end. However, whereas the prior art clamp 10 uses the bearing loops 24 to directly engage the head portion 32 during tightening of the clamp, in this embodiment 50 the clamp includes a latch insert 54 that is positioned within the first loop end 20. Referring to FIGS. 3a and 5, the latch insert 54 includes a body 56 having a first surface 57 and a second surface 57' and defining a first end 58, an intermediate portion 60, and a second end 62. The second end 62 of the body 56 depends from the intermediate portion 60, wherein the second end 62 is bent toward the first surface 57 of the intermediate portion 60 so that the second end 62 extends substantially perpendicular with respect to the intermediate portion 60 of the body 56. The first end 58 of the body 56 also depends from the intermediate portion 60 and defines a pair of legs 68, 68', wherein the legs 68, 68' are bent towards the first surface 57 of the intermediate portion 60, thus forming an arcuate shape. The legs 68, 68' are adapted to receive the head portion 32 of the T-bolt 30 as shown in FIG. 5. An inner edge 70 of each leg 68, 68' defines a recess area 72 adapted to receive the shank portion 34 of the T-bolt 30 as shown in FIG. 6. Referring to FIGS. 4 and 6, the latch insert 54 can be inserted into the first loop end 20 of the clamp 50, wherein each leg 68, 68' is received within the first end bearing loops 24 on the band 14.

Referring to FIG. 5, when the latch insert 54 is received within the first loop end 20, the second end 62 of the body 56 of the latch insert 54 extends through the first end slot 25 in a direction away from the outer surface 18 of the band 14. The second surface 57' of the second end 62 of the body 56 of the latch insert 54 abuts against an edge E (shown in FIG. 6) of the slot 25, thus preventing the latch insert 54 from disengaging from the first loop end 20. The latch insert 54 can be made from a unitary piece of metal, such as steel, ceramic material, or polymeric material, such as plastic. In one embodiment, it is made from tempered steel and has a thickness that is between 130% and 200% the thickness of the band 14. Thus, for example, the band can be made from 310¼ hard stainless steel, 1 mm to 1.5 mm thick, with the latch insert 54 being made from 301¼ hard stainless steel in a thickness of about 2 mm.

In operation, the latch insert 54 can be inserted through the first end cutout 25 into the first loop end 20 of T-bolt clamp 50, wherein the legs 68, 68' are received within the first end bearing loops 24 of the band 14 as shown in FIG. 6. Alternatively, the latch insert can be inserted into the first loop end 20 during the formation of that loop end and can be sized so that it is thereafter captively retained in the loop end, meaning that it then cannot be removed without at least some deformation of the loop end or latch insert. The head portion 32 of the T-bolt 30 passes through the slot 25 of the first loop end 20 and the recess area 72 of latch insert 54, wherein the head portion 32 is pivotally received within the legs 68, 68' on the first end 58 of the body 56 of the latch insert 54 as shown in FIGS. 4 and 5. The band 14 is then fastened around an object (not shown) and the shank portion 34 of the T-bolt 30 is inserted through a passageway 37 (shown in FIG. 3) in the trunnion 36. Referring to FIG. 4, a nut 38 can be threaded on the shank portion 34 of the T-bolt 30 and the clamp 50 can be tightened by rotating the nut 38 toward the trunnion 36, thereby drawing the loop ends 20, 22 toward each other. The latch insert 54 provides additional strength to the first loop end 20, thus preventing the bearing loops 24 from spreading apart and disengaging the T-bolt 30 from the first loop end 20 of the band 14 as shown in FIG. 1. The clamp 50 can be unloosened from an object by rotating the nut 38 away from the trunnion 36. The second end 62 of the body 56 of latch insert 54 helps inhibit the head portion 32 of T-bolt 30 from easily backing out and disengaging the T-bolt 30 from the first loop end 20 of the band 14.

Figure 7:
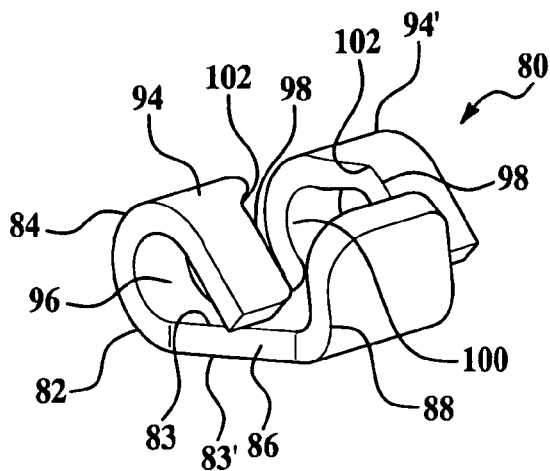
FIG. 7 is a perspective view of a latch insert made in accordance with a second embodiment of the present invention.
Figure 8:
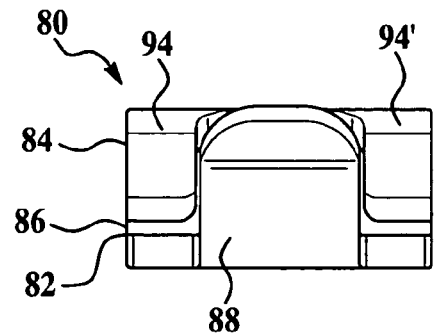
FIG. 8 is a front elevational view of the latch insert shown in FIG. 7.
Figure 9:
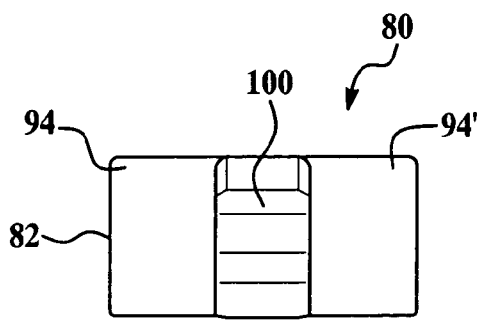
FIG. 9 is a rear elevational view of the latch insert shown in FIG. 7.
Figure 10:
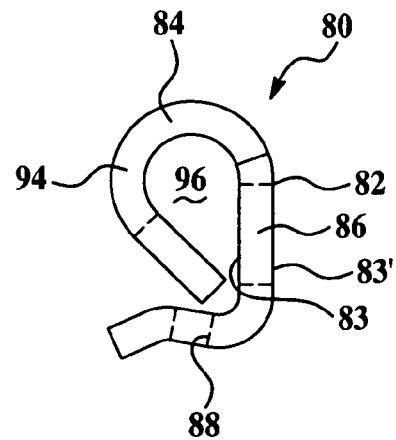
FIG. 10 is a side elevational view of the latch insert shown in FIG. 7.
Figure 11:
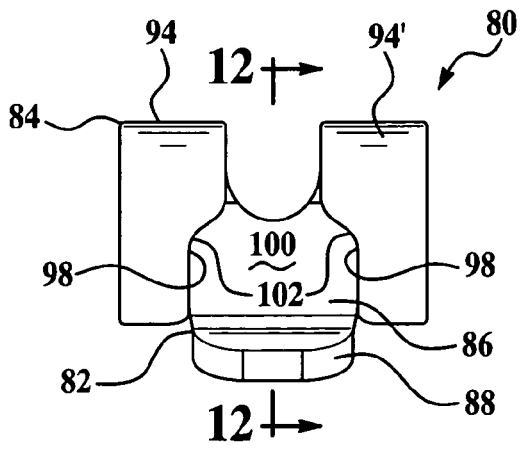
FIG. 11 is a top plan view of the latch insert shown in FIG. 7.
Figure 12:
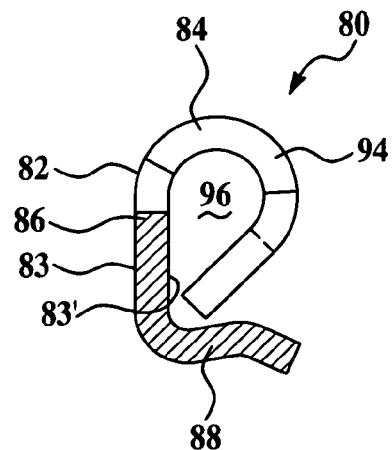
FIG. 12 is a sectional view of the latch insert taken along the 12-12 lines of FIG. 11.
Figure 13:
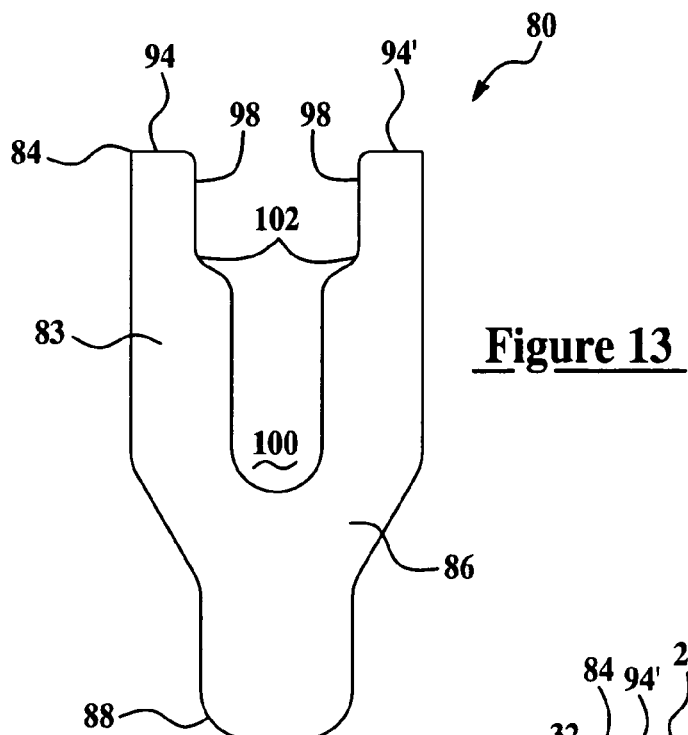
FIG. 13 is a top plan view of the latch insert shown in FIG. 7 before being bent.

FIGS. 7-13 show a second embodiment of a latch insert 80 that is similar to latch insert 54 except for the noted differences described below. FIG. 13 shows the latch insert 80 before being bent from a flat unitary piece of metal. The latch insert 80 can also be molded from a ceramic material or a polymeric material, such as plastic. Referring to FIG. 7, the latch insert 80 includes a body 82 having a first surface 83 and a second surface 83' and defining a first end 84, an intermediate portion 86, and a second end 88. The second end 88 of the body 82 depends from the intermediate portion 86, wherein the second end 88 is bent toward the first surface 83 of the intermediate portion 86 so that the second end 88 extends substantially perpendicular to the intermediate portion 86 of the body 82. The first end 84 of the body 82 also depends from the intermediate portion 86 and defines a pair of legs 94, 94'. Referring to FIGS. 7, 11, and 13, a recess area 100 is defined between an inner edge 98 of each leg 94, 94'. A lip 102 is also defined on the inner edge 98 of each leg 94, 94'. The difference between latch insert 54 and latch insert 80 is that the legs 94, 94' are bent so that each end of the legs 94, 94' is positioned to contact the first surface 83 of the intermediate portion 86, thus forming a loop-shaped cavity 96 as shown in FIGS. 7, 10, and 12.

Figure 14:
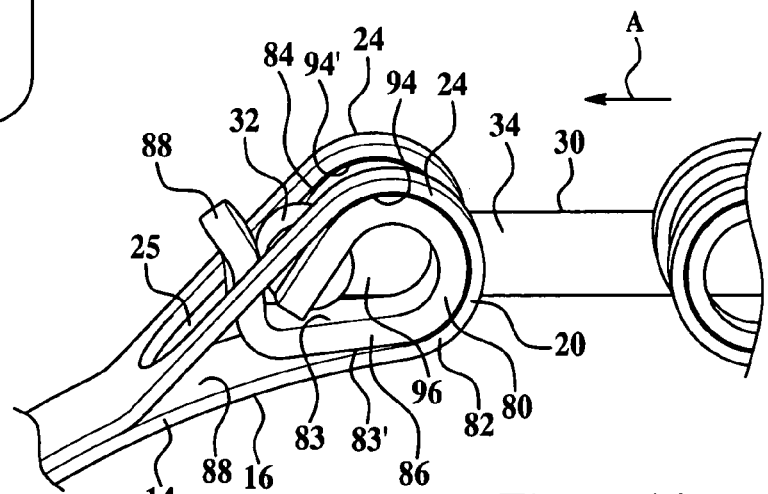
FIG. 14 is a side perspective view of a portion of a T-bolt clamp made in accordance present invention using the latch insert shown in FIG. 7.
Figure 15:
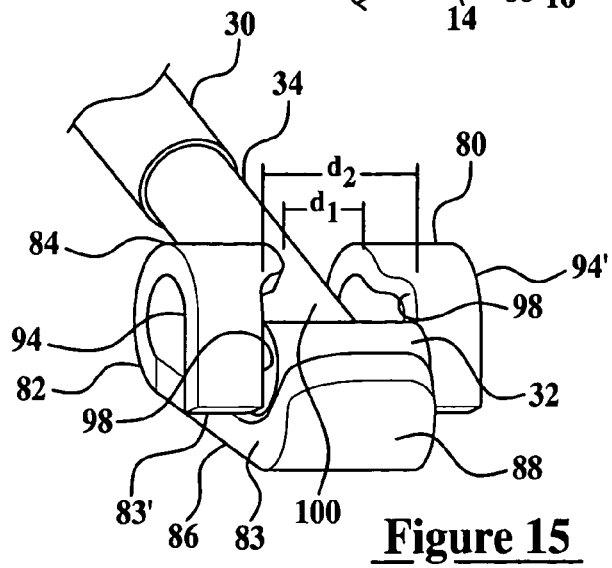
FIG. 15 is a front perspective view of a portion of a T-bolt received within the latch insert shown in FIG. 7.
Figure 16:
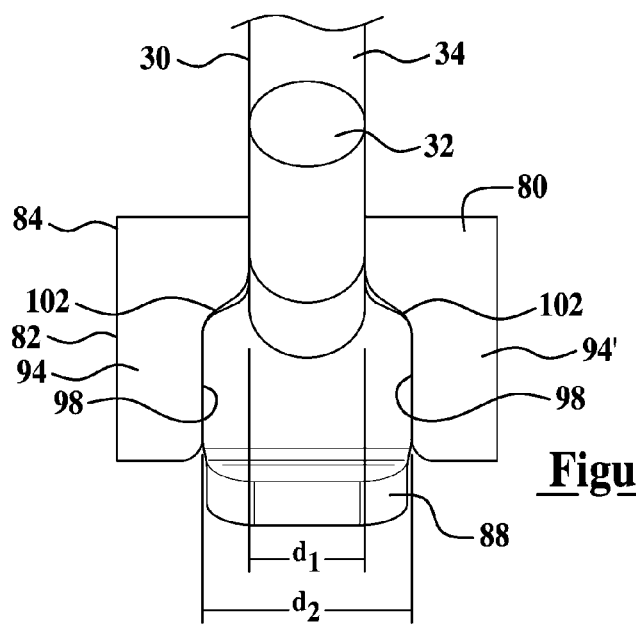
FIG. 16 is a top perspective view of a portion of a T-bolt being inserted into the latch insert shown in FIG. 7.

FIGS. 14-16 show a T-bolt 30 inserted into latch insert 80. In operation, latch insert 80 operates in the same manner as latch insert 54 except for several differences noted below. In clamp 50, the second end 62 of latch insert 54 abuts against an edge E of the cutout 25, thus preventing the latch insert 54 from disengaging from the first loop end 20 (shown in FIG. 6). In contrast, the first end bearing loops 24 which enclose around the loop-shaped legs 94, 94' prevent the latch insert 80 from disengaging from the first loop end 20 of the band 14 as shown in FIG. 14. Thus, the latch insert 80 is captively retained in the first loop end 20. Referring to FIGS. 15 and 16, the inner edge 98 of each leg 94, 94' adjacent each lip 102 represented by distance $d_2$ of recess area 100 contacts the head portion 32 of T-bolt 30, thus preventing the T-bolt 30 from spinning when the clamp 50 is tightened around an object.

Referring to FIG. 16, the inner edge 98 of each leg 94, 94' represented by distance $d_1$ of recess area 100 contacts the shank portion 34 as T-bolt 30 is inserted into the latch insert 80, thus preventing misalignment of the shank portion 34 with the passageway 37 of the trunnion 36. The distance $d_1$ is generally greater than the diameter of the head portion 32 of the T-bolt 30. When the head portion 32 of T-bolt 30 is not properly mated with the surface 83 of the latch insert 80 as shown in FIG. 16, the head portion 32 will pass through the recess area 100 represented by distance $d_1$ without pulling against the inner edge 98 of each leg 94, 94' of the latch insert 80, thus weakening the clamp 50. Thus, as shown in FIG. 15, when the elongated head portion 32 is axially aligned and seated within the cavity 96, the head portion engages the inner surface 83 of the wider portions of the legs 94, 94'. However, if the head portion 32 is mis-inserted so that it is oriented radially as shown in FIG. 16, it will slip out of the first loop end 20 as a result of the distance $d_1$ between the legs 94, 94' being greater than the thickness of the head portion. The second end 88 of the body 82 of latch insert 80 acts as a tab that can prevent the head portion 32 of T-bolt 30 from easily backing out of the slot 25, thus disengaging the T-bolt 30 from the first loop end 20 whenever a force is applied on the T-bolt 30 in a direction toward the first loop end 20 as represented by arrow A shown in FIG. 14. Furthermore, as shown, this tab 88 extends out of the slot and includes a distal end that is bent away from the bearing loops, and this construction helps guide the head portion 32 of the T-bolt into the slot 25 when the head portion is being connected to the first loop end 20.

Figure 17:
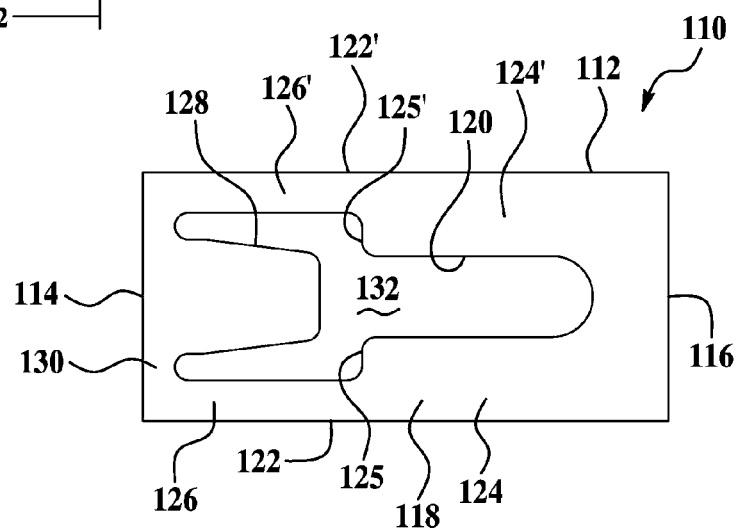
FIG. 17 is a top plan view of a latch insert made in accordance with a third embodiment, and showing the latch insert in the form of a blank prior to being bent into its final form.
Figure 18:
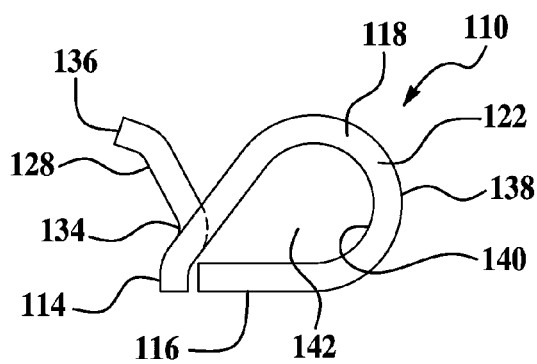
FIG. 18 is a side view of the third embodiment of the latch insert in its final form.
Figure 19:
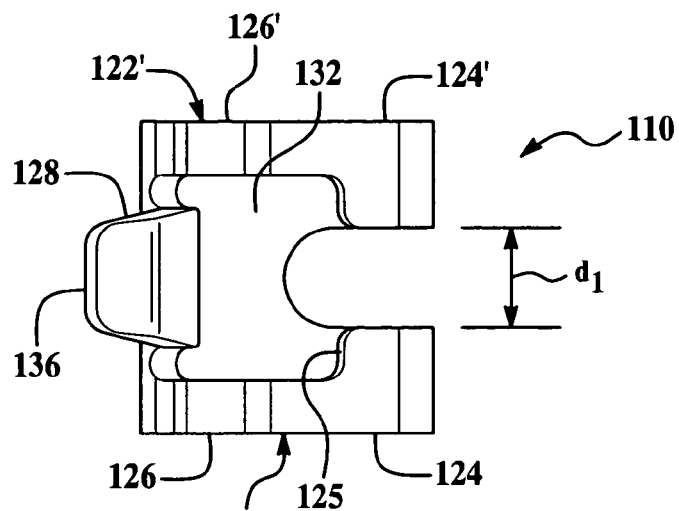
FIG. 19 is a top view of the latch insert of FIG. 18.

With reference to FIGS. 17-19, there is shown a third embodiment 110 of a latch insert. This latch insert 110 can be used in the same manner as that of the embodiment of FIGS. 7-16 and therefore the description of the remaining portions of the clamp are not repeated here. FIG. 17 depicts a flat blank 112 used to construct the latch insert 110. The blank 112 has a first end 114, second end 116, and intermediate portion 118. It is made from flat strip metal and has a thickness of about 2 mm. Before bending to its final configuration, a cutout 120 is stamped into the blank 112, and this cutout defines a pair of legs 122, 122'. The legs each have a first portion 124, 124' having a first width and a second portion 126, 126' having a second width. The two portions of each leg are separated by a step 125, 125', although a more subtle transition can be used if desired. As with the first two embodiments, the latch insert 110 includes a tab 128; however, in this embodiment, tab 128 extends from the first end 114 rather than being located at the second end of the insert. In particular, the legs 122, 122' do not terminate at distal, free ends as in the other embodiments, but instead are connected to each other by a bridging portion 130 at the free end 114, and the tab 128 also extends from this bridging portion 130.

To make the latch insert 110 from the blank 112 of FIG. 17, the blank 112 is bent at its intermediate portion 118 with the first end 114 being brought to a position adjacent the second end 116. Also, the tab 128 is bent out away from the intermediate portion 118 and this provides the portion of the opening 132 through which the head portion of the T-bolt can be inserted. This tab 128 extends from a proximal end 134 at the bridging portion 130 to a distal, free end 136. The tab is bent away from the legs and intermediate portion to form an angle as shown in FIG. 18 that helps guide the T-bolt head portion into the slot of the loop end and into the opening in the latch insert. The distal end 136 can be further bent away from the remainder of the latch insert as in the second embodiment.

The result of this construction is a latch insert that operates in much the same fashion as the second embodiment. It includes a pair of spaced legs 122, 112', an opening 130 to accommodate the head portion and shank of the T-bolt, and a tab to help guide the head portion into the loop end and retain it there. During use, the head portion of the T-bolt engages an inner surface 140 of the legs 122, 122' which transfers the tightening force to the bearing loops via an outer surface 138 of the latch insert.

Figure 20:
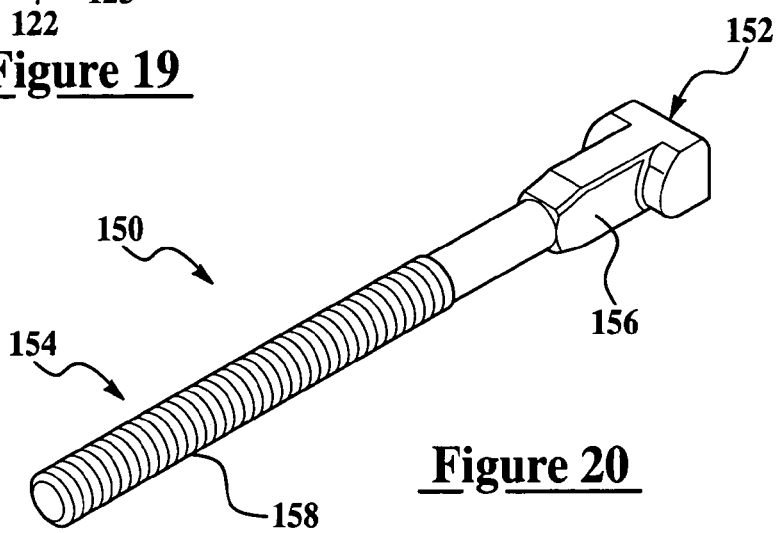
FIG. 20 is a perspective view of a second embodiment of a T-bolt that can be used with the T-bolt clamps of the first three embodiments.
Figure 21:
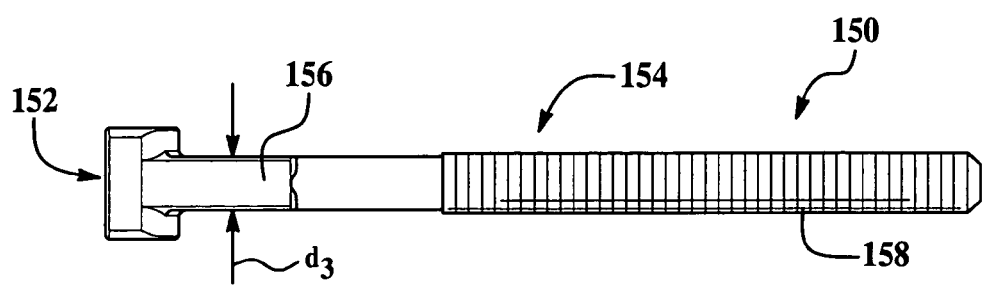
FIG. 21 is a top view of the T-bolt of FIG. 20.
Figure 22:
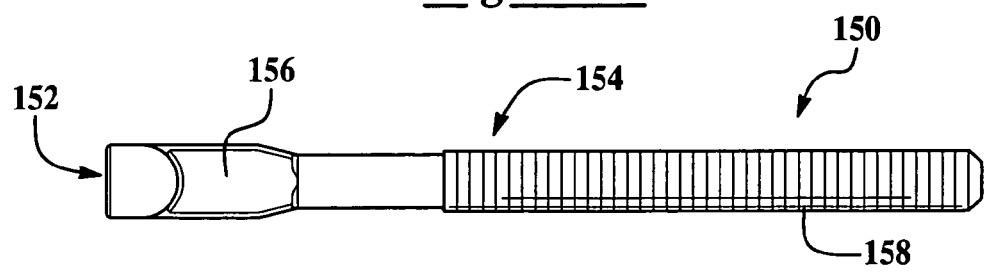
FIG. 22 is a side view of the T-bolt of FIG. 20.

Referring now to FIGS. 20-22, an alternative embodiment 150 of a T-bolt is shown in which the shank 154 includes a specially shaped portion adjacent the T-bolt head 152. In particular, the shank 154 has a first segment 156 that has a rectangular cross-section shape, and this transitions to a more conventional rounded segment 158 that is at least partially threaded along its length. The width $d_3$ of this first segment is just slightly less than the width $d_1$ of the opening between the first portion of the legs of the latch inserts of the prior embodiments where the shank passes through. As a result, once the shank is placed into this opening between the legs, it is unable to turn and this prevents rotation of the shank and head portions during tightening of the clamp. Although the dimension $d_3$ is preferably just slightly less than $d_1$, it is sufficient if the diagonal of the segment 156 is larger than the width $d_1$ of the space, since this would only allow partial rotation with edges of the shank at opposite ends of the diagonal then engaging the inner edges of the legs of the latch insert and preventing further rotation. In the illustrated embodiment, the segment has a rectangular cross-sectional shape; however, other suitable non-circular cross-sectional shapes that can engage the inner edges of the legs of the latch insert can be used. For example, the segment 156 can be formed from an enlarged diameter rounded rod that is truncated at opposite sides of the segment to define two flats that allow the shaft to slide into the thinned portion of the opening in the latch insert. Thus, rather than having the rectangular cross-section shown in FIG. 20, the segment 156 will have two flats, one at the location where the FIG. 20 lead line for reference numeral 156 ends, and one on the opposite side, with the upper and lower surfaces of this segment 156 being rounded rather than flat as shown. In any event, the height of the T-bolt 150 (measured in a vertical direction in FIGS. 20 and 22) should be greater than the distance $d_1$ so that the shank of the T-bolt cannot be inserted in between the bearing loops in the wrong orientation.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A T-bolt clamp, comprising:
   a band having first and second loop ends and a roundish body portion that extends circumferentially between said first and second loop ends;
   a fastening assembly connected to said loop ends and including a T-bolt fastener and trunnion, wherein said T-bolt fastener includes a T-bolt having a head portion that connects to said first loop end and an at least partially threaded shank portion that extends from said head portion to said second loop end, said trunnion being connected to said second loop end with said shank extending through said trunnion, and wherein said T-bolt fastener further includes a nut that threads onto said shank and engages said trunnion, whereby said loop ends can be drawn towards each other to tighten said clamp by further threading said nut onto said shank after it engages said trunnion to thereby draw said trunnion towards said head portion of said T-bolt;
   said first loop end including a slot that permits said head portion of said T-bolt to be inserted into and removed from said first loop end without removal of said nut from said shank portion, wherein said slot defines first and second bearing loops in said first loop end, with said head portion of said T-bolt being retained in said first loop end by said bearing loops during tightening of said clamp; and
   a latch insert located within said first loop end and defining a cavity sized to receive said head portion of said T-bolt, said latch insert having an opening aligned with said slot of said first loop end such that said head portion can be inserted into said cavity via said slot and said opening;
   wherein said latch insert comprises a pair of spaced legs each of which extends along an inner surface of one of said bearing loops, whereby, when said head portion of said T-bolt is seated within said cavity, said head portion engages said legs during tightening of said clamp to thereby transfer tightening forces from said head portion to said first loop end via said legs; and
   wherein said head portion of said T-bolt comprises an elongated portion that extends axially when said head portion is seated in said cavity, said legs each including a first portion having first width and a second portion having a second width that is less than said first width, wherein said first portion defines a space between said legs that is sized to receive said shank portion of said T-bolt and said second portion defines a space between said legs that is sized to permit said head portion to be inserted and removed from said cavity while oriented axially; and
   wherein said shank portion of said T-bolt includes a segment extending from said head portion that has a non-circular cross-sectional shape, wherein the width of said space between said first portions of said legs is less than a diagonal of said cross-sectional shape, whereby said first portions of said legs prevent said T-bolt from rotating when said head portion is seated in said cavity with said shank portion extending out of said first loop end through said space between said first portions of said legs.

2. A T-bolt clamp as defined in claim 1, wherein the space between said first portions of said legs is sized to permit said head portion of said T-bolt to pass between said first portions of said legs when said head portion is radially oriented.

3. A T-bolt clamp, comprising:
   a band having first and second loop ends and a roundish body portion that extends circumferentially between said first and second loop ends;
   a fastening assembly connected to said loop ends and including a T-bolt fastener and trunnion, wherein said T-bolt fastener includes a T-bolt having a head portion that connects to said first loop end and an at least partially threaded shank portion that extends from said head portion to said second loop end, said trunnion being connected to said second loop end with said shank extending through said trunnion, and wherein said T-bolt fastener further includes a nut that threads onto said shank and engages said trunnion, whereby said loop ends can be drawn towards each other to tighten said clamp by further threading said nut onto said shank after it engages said trunnion to thereby draw said trunnion towards said head portion of said T-bolt;

said first loop end including a slot that permits said head portion of said T-bolt to be inserted into and removed from said first loop end without removal of said nut from said shank portion, wherein said slot defines first and second bearing loops in said first loop end, with said head portion of said T-bolt being retained in said first loop end by said bearing loops during tightening of said clamp; and a latch insert located within said first loop end and defining a cavity sized to receive said head portion of said T-bolt, said latch insert having an opening aligned with said slot of said first loop end such that said head portion can be inserted into said cavity via said slot and said opening;

wherein said latch insert comprises a pair of spaced legs each of which extends along an inner surface of one of said bearing loops, whereby, when said head portion of said T-bolt is seated within said cavity, said head portion engages said legs during tightening of said clamp to thereby transfer tightening forces from said head portion to said first loop end via said legs; and wherein said latch insert includes a first end, intermediate portion, and a second end, with said second end comprising a tab that depends from said intermediate portion and extends out of said slot, and said first end comprising a distal end of said legs that is positioned adjacent the junction of said intermediate portion and said second end.

4. A T-bolt clamp, comprising:

a band having first and second loop ends and a roundish body portion that extends circumferentially between said first and second loop ends;

a fastening assembly connected to said loop ends and including a T-bolt fastener and trunnion, wherein said T-bolt fastener includes a T-bolt having a head portion that connects to said first loop end and an at least partially threaded shank portion that extends from said head portion to said second loop end, said trunnion being connected to said second loop end with said shank extending through said trunnion, and wherein said T-bolt fastener further includes a nut that threads onto said shank and engages said trunnion, whereby said loop ends can be drawn towards each other to tighten said clamp by further threading said nut onto said shank after it engages said trunnion to thereby draw said trunnion towards said head portion of said T-bolt;

said first loop end including a slot that permits said head portion of said T-bolt to be inserted into and removed from said first loop end without removal of said nut from said shank portion, wherein said slot defines first and second bearing loops in said first loop end, with said head portion of said T-bolt being retained in said first loop end by said bearing loops during tightening of said clamp; and a latch insert located within said first loop end and defining a cavity sized to receive said head portion of said T-bolt, said latch insert having an opening aligned with said slot of said first loop end such that said head portion can be inserted into said cavity via said slot and said opening;

wherein said latch insert comprises a pair of spaced legs each of which extends alone an inner surface of one of said bearing loops, whereby, when said head portion of said T-bolt is seated within said cavity, said head portion engages said legs during tightening of said clamp to thereby transfer tightening forces from said head portion to said first loop end via said legs; and wherein said latch insert includes a first end, intermediate portion, and a second end, with said latch insert being bent into a loop shape such that said second end is positioned adjacent said first end, and wherein said legs extend along opposite sides of said opening from said intermediate portion to said first end and are connected together at said first end by a bridging portion of said latch insert.

5. A T-bolt clamp as defined in claim 4, wherein said latch insert includes a tab extending from said bridging portion of said first end, said tab extending out of said slot at a location in said slot opposite said bearing loops and being bent in a direction away from said bearing loops to thereby help guide said head portion of said T-bolt into said opening when said head portion is being connected to said first loop end.

6. A T-bolt clamp, comprising:

a band having first and second loop ends and a roundish body portion that extends circumferentially between said first and second loop ends;

a fastening assembly connected to said loop ends and including a T-bolt fastener and trunnion, wherein said T-bolt fastener includes a T-bolt having a head portion that connects to said first loop end and an at least partially threaded shank portion that extends from said head portion to said second loop end, said trunnion being connected to said second loop end with said shank extending through said trunnion, and wherein said T-bolt fastener further includes a nut that threads onto said shank and engages said trunnion, whereby said loop ends can be drawn towards each other to tighten said clamp by further threading said nut onto said shank after it engages said trunnion to thereby draw said trunnion towards said head portion of said T-bolt;

said first loop end including a slot that permits said head portion of said T-bolt to be inserted into and removed from said first loop end without removal of said nut from said shank portion, wherein said slot defines first and second bearing loops in said first loop end, with said head portion of said T-bolt being retained in said first loop end by said bearing loops during tightening of said clamp; and a latch insert located within said first loop end and defining a cavity sized to receive said head portion of said T-bolt, said latch insert having an opening aligned with said slot of said first loop end such that said head portion can be inserted into said cavity via said slot and said opening;

wherein said latch insert includes a tab that projects out of said slot at a location in said slot that is opposite said bearing loops.

7. A T-bolt clamp as defined in claim 6, wherein said tab includes a distal end that is bent away from said bearing loops.

* * * * *